D. R. PRATT.

Nut-Lock.

No. 8,970. Reissued Nov. 18, 1879.

Witnesses.
Jacob Felbel
H. C. Janvier

Inventor:
Daniel R. Pratt
By attorney.
J. N. McIntire

N. PETERS, PHOTO-LITHOGRAPHER, WASHINGTON, D. C.

UNITED STATES PATENT OFFICE.

DANIEL R. PRATT, OF BROOKLYN, NEW YORK.

IMPROVEMENT IN NUT-LOCKS.

Specification forming part of Letters Patent No. 156,235, dated October 27, 1874; Reissue No. 8,970, dated November 18, 1879; application filed September 19, 1879.

*To all whom it may concern:*

Be it known that I, DANIEL R. PRATT, of Brooklyn, in the county of Kings and State of New York, have invented a new and useful Improvement in what I denominate a "Raised Follower and Spring-Washer;" and I do hereby declare the following to be a true and correct description of the construction and operation of the same, reference being had to the annexed drawings, making part and parcel of this my specification.

The nature of my invention consists in the use, in connection with the usual spring and its cup-like receptacle, of a washer having a base adapted to cover and act on the confined spring, and formed with a raised central portion of less diameter for the nut to bear upon, whereby, while the entire surface of the spring is acted on by the washer, the latter may be forced down by the nut without any liability of the latter interfering with the top of the cup or the lugs thereon; and my invention further consists in making the raised central projection of the washer with an annular groove, for the purpose of reducing the amount of friction in any case in which that may be desirable.

To enable those skilled in the art to make and use my invention, I will now proceed to more fully describe it, referring by letters to the accompanying drawings, in which—

Figure 1:
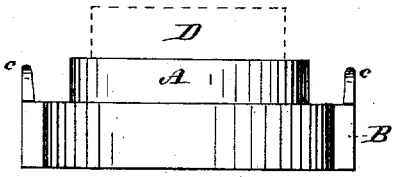
Figure 2:
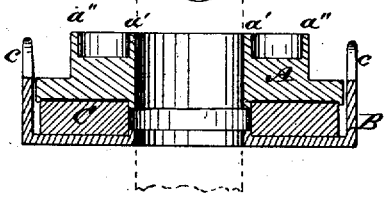

Figure 1 is a front view, showing the cup and follower, the dotted lines indicating the nut. Fig. 2 is a cross-section through the center of Fig. 1; and Fig. 3 is a top view, showing the concentric flanges on the upper side of the follower, and lugs formed upon the cup or spring-holder.

In the drawings, A represents the follower, having formed upon its two upper surfaces two concentric flanges, as seen at *a′ a″*. This furnishes a follower of much less weight of metal, and reduces the friction of the nut when screwed down upon it; and, being so high above the bottom of the follower, on account of the flanges *a′ a″*, the nut can never come in contact with the cup B and its ears *c*.

B is the cup, having within it the spring C, upon which spring, either of rubber or metal, the follower A rests. The follower is held in position by turning down upon its bottom the ears *c c*, as seen in Fig. 3.

Figure 3:
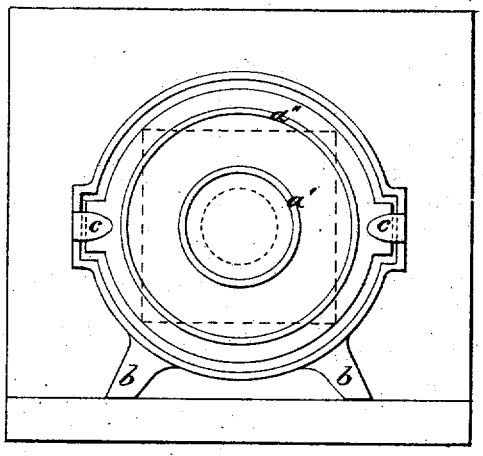

D, Fig. 1, is the nut, as is also seen in dotted lines in Fig. 3. *b b* are lugs formed upon one side of the bottom of the cup B to prevent the same from turning with the nut, and are secured in position by nails, spikes, or other device, against which the lugs may rest.

The cup has formed upon its bottom side two or more lugs, *b*, that may be secured in any suitable manner to the object upon which it is desired to apply this device to prevent the same from turning. The cup has two or more grooves or depressions in its sides, corresponding with and intended to receive two or more lugs or projections formed upon the follower; and ears *c* are formed upon the upper rim o side of the cup to be bent upon the lugs or projections of the follower fitting into the grooves of the cup, thereby preventing any disengagement of the cup and follower.

By this mode of securing the follower and the cup or spring-holder together the follower will not be turned or moved when the nut is screwed upon the bolt.

What I claim as new, and desire to secure by Letters Patent, is—

1. In combination with the cup-like receptacle B and its contained spring, a washer or follower, A, having a base about equal in area to the area of the top surface of the spring, and formed or provided with a central raised portion of less size for the nut to bear on, substantially as set forth.

2. A washer or follower having a raised portion of less diameter than its base, and grooved so as to present narrow annular and concentric bearing-surfaces *a′ a″* for the nut, substantially as set forth.

DANIEL R. PRATT.

In presence of—
W. H. MORSE,
JACOB FELBEL.